United States Patent [19]
Edakubo et al.

[11] Patent Number: 4,780,774
[45] Date of Patent: Oct. 25, 1988

[54] ROTARY HEAD TYPE REPRODUCING APPARATUS HAVING A HEAD SHIFTER FOR ACCURATELY SHIFTING THE ROTARY HEAD

[75] Inventors: Hiroo Edakubo; Tatsuzo Ushiro, both of Tokyo; Nobutoshi Takayama; Hiroyuki Takimoto, both of Kanagawa, all of Japan

[73] Assignee: Canon Kabushiki Kaisha

[21] Appl. No.: 652,762

[22] Filed: Sep. 20, 1984

[30] Foreign Application Priority Data

Sep. 22, 1983 [JP] Japan ................. 58-175379
Sep. 22, 1983 [JP] Japan ................. 58-175380
Oct. 18, 1983 [JP] Japan ................. 58-195763

[51] Int. Cl.⁴ ................. G11B 5/588; G11B 5/592
[52] U.S. Cl. ................. 360/77; 360/10.2; 360/73
[58] Field of Search ........... 360/77, 73, 10.2, 10.3, 360/DIG. 1, 70, 78

[56] References Cited

U.S. PATENT DOCUMENTS

| | | | |
|---|---|---|---|
| 4,489,352 | 12/1984 | Kobayashi et al. | 360/10.3 |
| 4,509,083 | 4/1985 | Nakano | 360/77 |
| 4,549,234 | 10/1985 | Sakamoto | 360/10.2 |
| 4,558,382 | 12/1985 | Edakubo et al. | 360/77 |
| 4,568,986 | 2/1986 | Furuhata et al. | 360/10.2 |
| 4,573,089 | 2/1986 | Maeda et al. | 360/77 |
| 4,644,413 | 2/1987 | Takayama | 360/10.2 |
| 4,665,449 | 5/1987 | Kozuki et al. | 360/77 |

Primary Examiner—Aristotelis M. Psitos
Assistant Examiner—Steven R. Garland
Attorney, Agent, or Firm—Toren, McGeady & Associates

[57] ABSTRACT

A rotary type reproducing apparatus for reproducing a recorded signal through the tracing of many recording tracks formed at a predetermined pitch on a record bearing medium, one after another, includes a moving apparatus for moving the record bearing medium in a direction which crosses the recording tracks; a shifting apparatus for shifting the rotary head in a direction which crosses the rotation plane thereof; an apparatus for forming a first pulse signal in association with the record bearing meduim moving action of the moving apparatus; an apparatus for forming, on the basis of the first pulse signal, a second pulse signal which is of a higher frequency than the first pulse signal; a counting apparatus for counting the pulses of the second pulse signal; and a control apparatus for forming, on the basis of the counter value of the counting apparatus, a control signal which controls the shifting apparatus. Arranged as such, the shifting apparatus shifts the rotary head using a control signal which is in close proximity to an ideally analogously varying control signal, so that the recording tracks on the medium may be accurately traced.

16 Claims, 15 Drawing Sheets

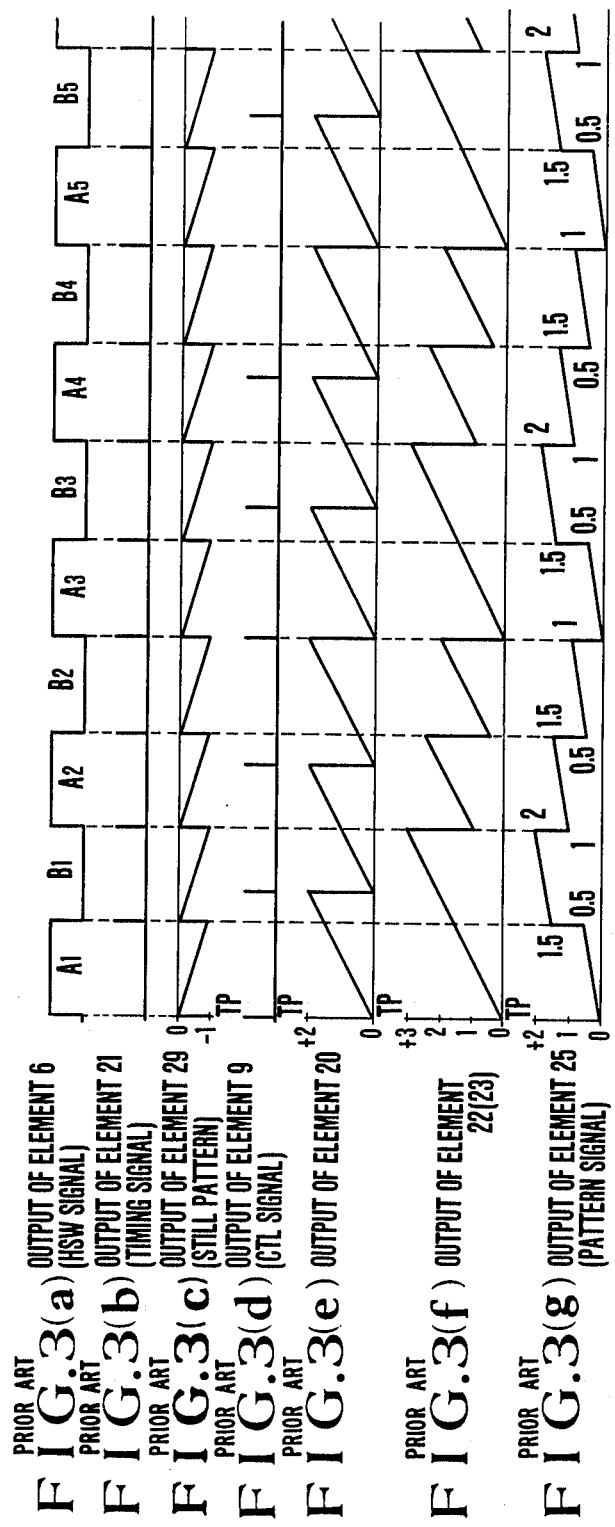

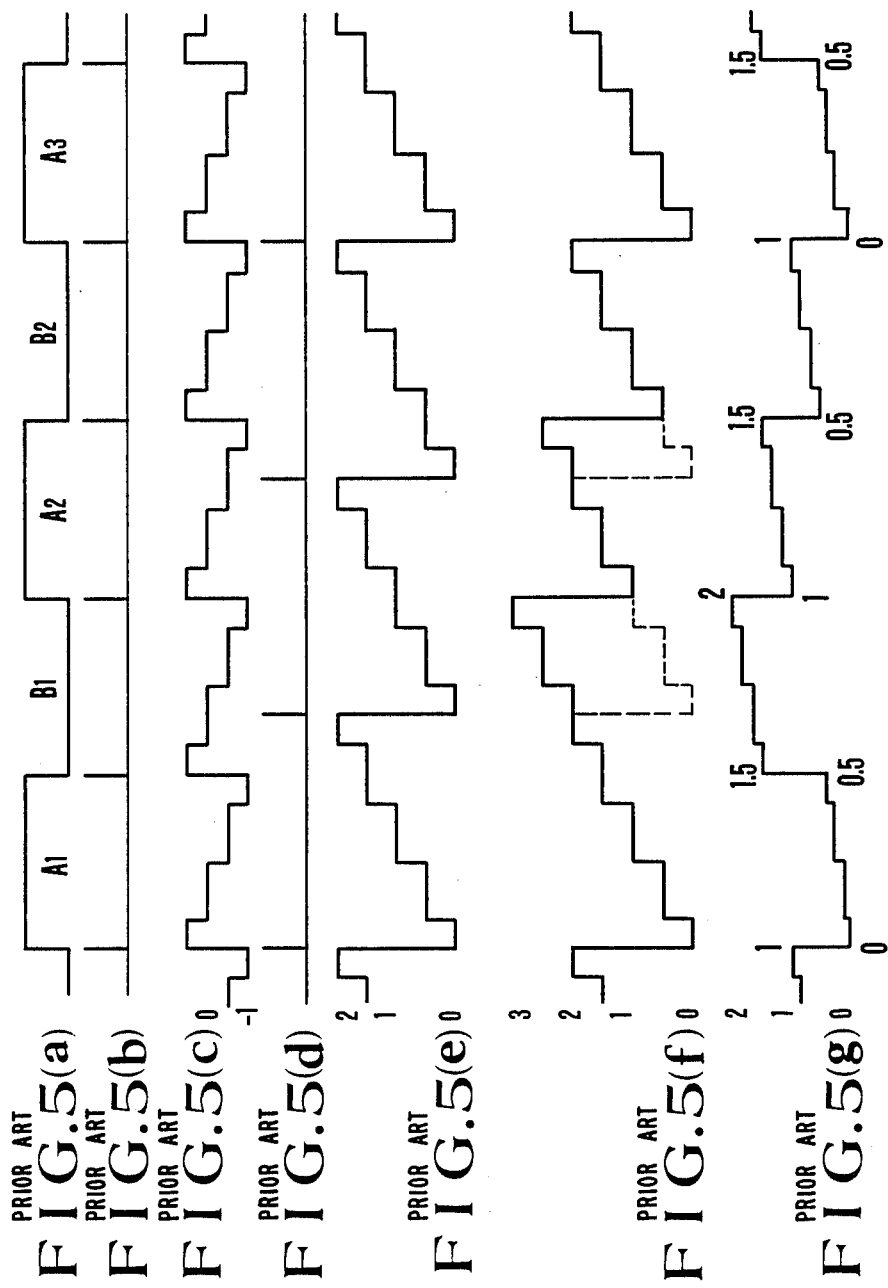

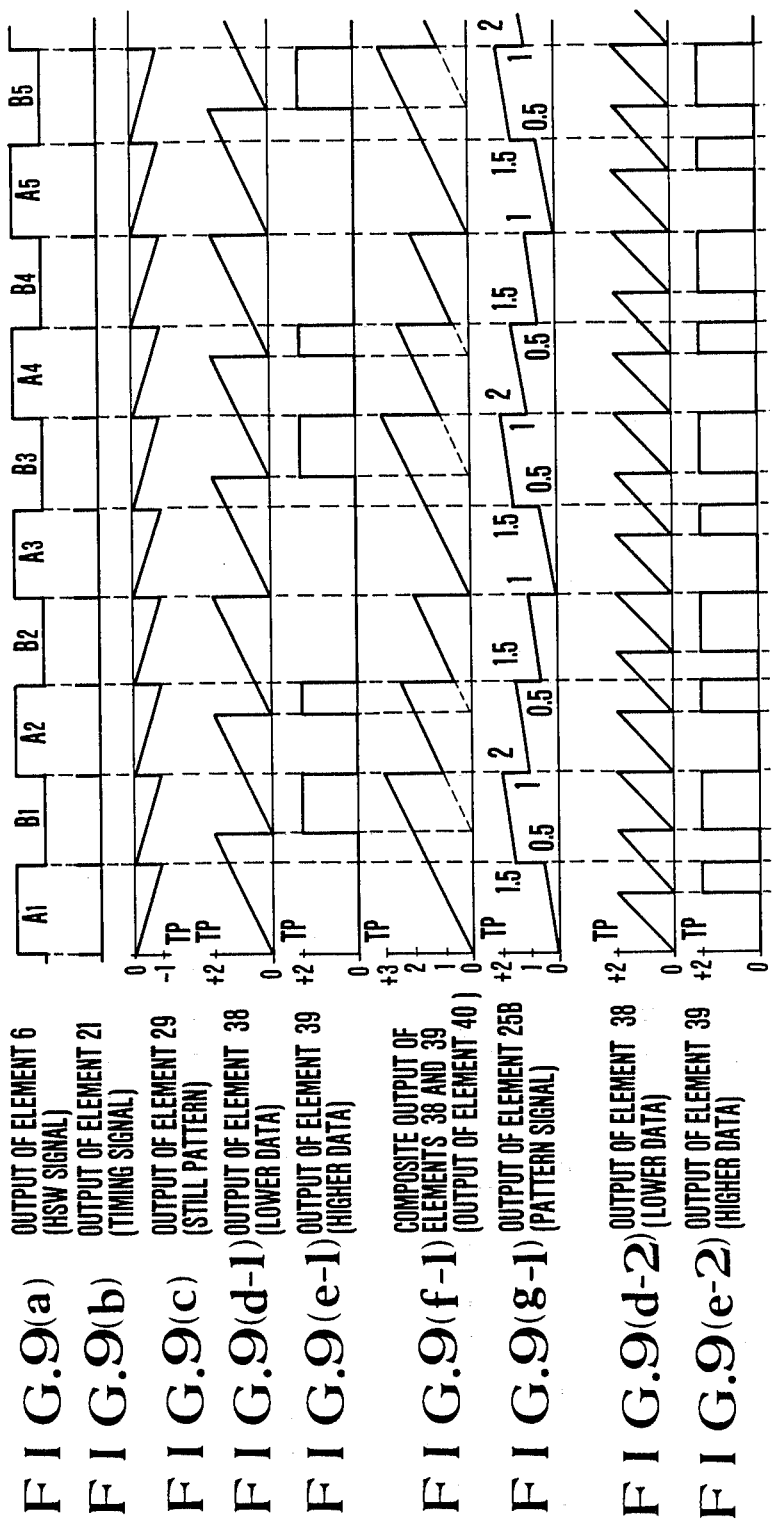

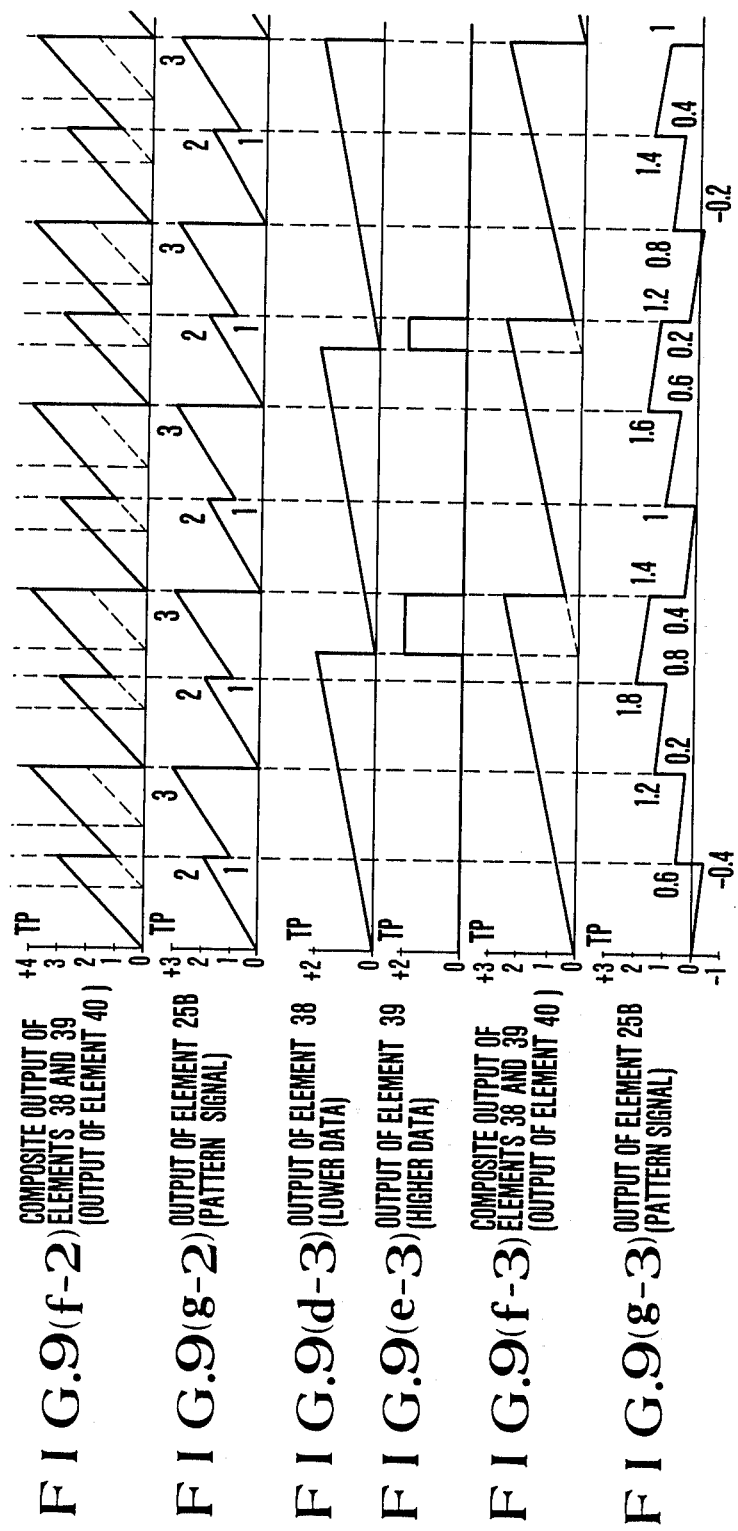

F I G. 14
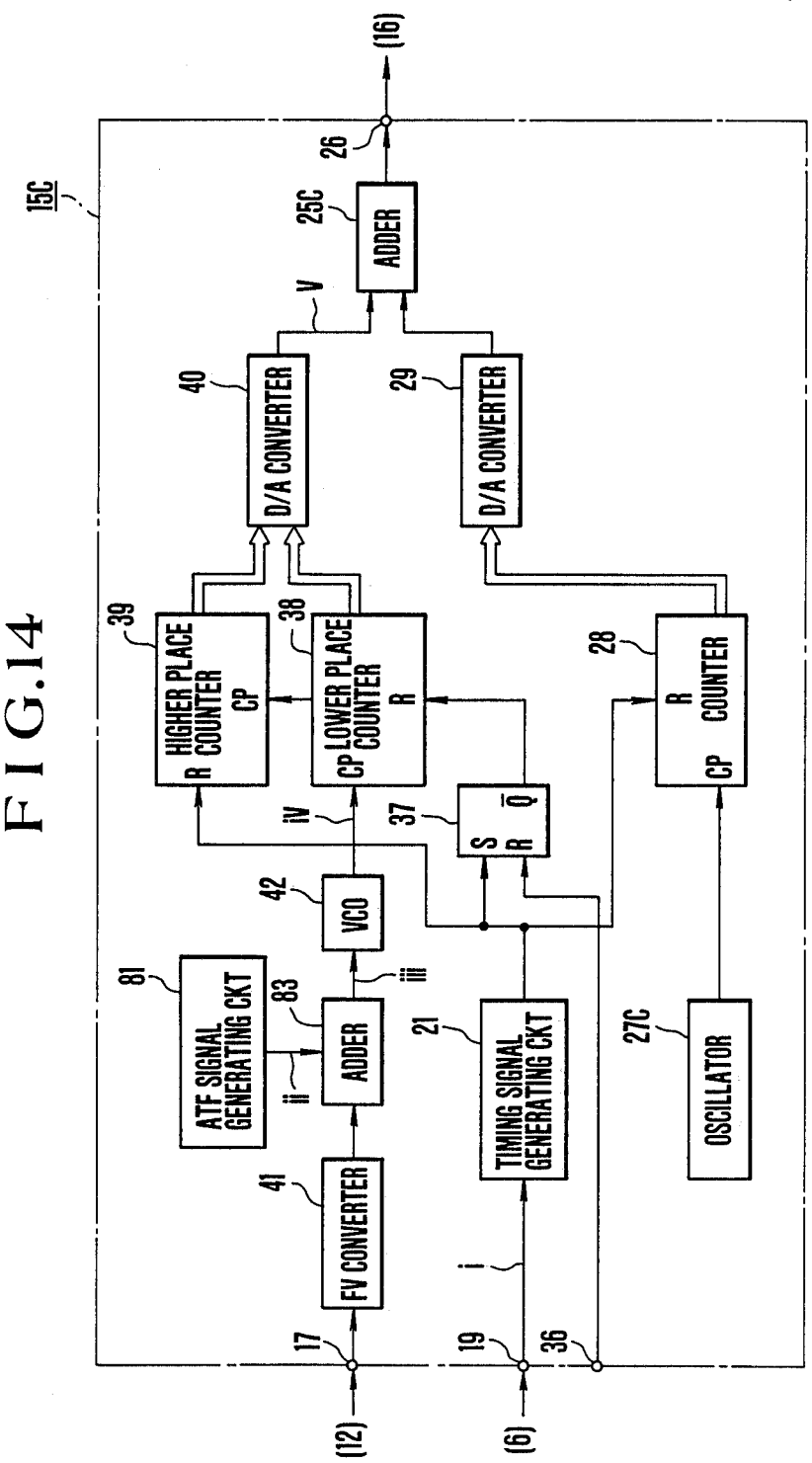

F I G. 15 (i)
F I G. 15 (ii)
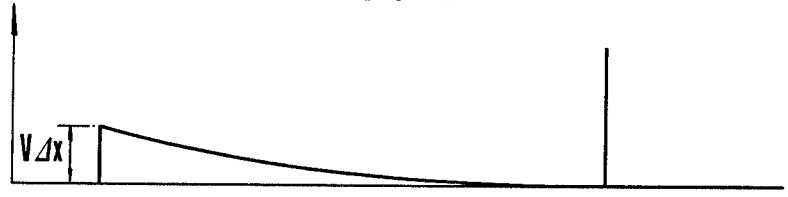
F I G. 15 (iii)
F I G. 15 (iv)
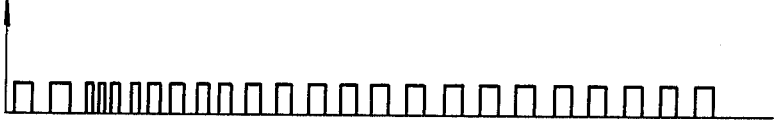
F I G. 15 (v)
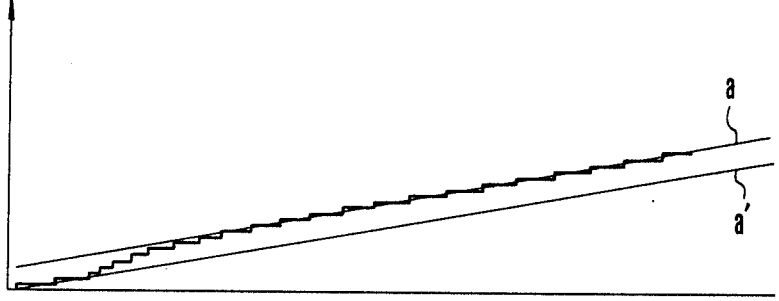

ROTARY HEAD TYPE REPRODUCING APPARATUS HAVING A HEAD SHIFTER FOR ACCURATELY SHIFTING THE ROTARY HEAD

BACKGROUND OF THE INVENTION

1. Field of the Invention

This invention relates to a rotary head type reproducing apparatus and more particularly to an apparatus for reproducing a recorded signal through the tracing of many recording tracks formed on a record bearing medium at a predetermined pitch, one after another. The reproducing rotary head is shifted by shifting means in a direction which crosses the rotation plane thereof.

2. Description of the Prior Art

In order to have a sharp image stably reproduced by so-called special reproduction carried out at an arbitrary tape travel speed which differs from the recording speed, (i.e. a high speed reproduction, low speed reproducing (including a still picture reproduction), backward or reverse rotating reproduction, etc. with a rotary head type reproducing apparatus such as a video tape recorder (hereinafter called a VTR)) the reproducing head of the apparatus must accurately trace each recording track for each scanning field to prevent the occurrence of a noise bar.

To meet this requirement, there has been known a method in which a pattern signal generating device generates a pattern signal corresponding to a distance from the reproducing head scanning locus obtained at an arbitrary tape travel speed to a recording track on the tape; and head shifting means such as a piezoelectric conversion element (a bimorph element, for example) shifts the position of the reproducing head in a direction perpendicular to the rotating plane thereof, according to the pattern signal obtained from the pattern signal generating device.

The conventional VTR employing the above-stated method is arranged as shown in FIG. 1 of the accompanying drawings. Referring to FIG. 1 which schematically shows only the arrangement of parts essentially related to the present invention, reference numeral 1 identifies a magnetic tape employed as a record bearing medium. The VTR is provided with reproducing heads 2A and 2B which have the same azimuth angle and are opposed to each other at an angle of 180 degrees. The heads 2A and 2B are mounted respectively on the free ends of piezoelectric conversion elements 3A and 3B, such as bimorph elements employed as the shifting means. The piezoelectric conversion elements 3A and 3B are mounted at their tail ends on a rotating member 4. The rotating member 4 is rotated by a head rotating motor 5 in the direction of the arrow shown in the drawing. Although it is not shown in the drawing, the heads 2A and 2B are rotated while protruding from a slit provided between a pair of tape guide drums in a manner which is well known. The tape 1 is obliquely wound at least 180 degrees arund the pair of drums. A rotation phase detector 6 detects the rotation phase of the heads 2A and 2B. A signal produced from the phase detector 6 is used as a head switching signal (hereinafter called the HSW signal) and is supplied to a head motor control circuit 7. The control circuit 7 controls, via a head motor driving circuit 8, the head motor 5, rotating the heads 2A and 2B at a predetermined phase and rotational frequency on the basis of the output of the detector 6. A control signal reproducing fixed head 9 (hereinafter called the CTL head) reproduces a control signal (hereinafter called the CTL signal), which is recorded in the lower part of the tape 1, at intervals of one frame portion in the longitudinal direction thereof. A capstan 10 moves the tape 1 in the longitudinal direction thereof in conjunction with a pinch roller (not shown). A capstan motor 11 rotates the capstan 10. A frequency signal generator 12 produces a frequency signal (hereinafter called the capstan FG signal or the first pulse signal), which corresponds to the rotation of the capstan 10. A capstan motor control circuit 13 controls the capstan motor 11 via a capstan motor driving circuit 14, rotating the capstan 10 at a predetermined phase and rotational frequency according to the CTL signal from the CTL head 9 and the capstan FG signal from the frequency signal generator 12. A pattern signal generating circuit 15 produces a pattern signal for the piezoelectric conversion elements 3A and 3B, having the heads 2A and 2B respectively trace one recording track on the tape 1 for each scanning field on the basis of the HSW signal from the rotation phase detector 6, the CTL signal from the CTL head 9 and the capstan FG signal from the frequency signal generator 12 in the event that reproduction is made at an arbitrary tape speed (including still picture reproduction and reverse rotating reproduction). A conversion element driving circuit 16 drives the conversion elements 3A and 3B according to the pattern signal produced from the pattern signal generating circuit 15.

FIG. 2 of the accompanying drawings shows an example of an arrangement of the above-stated pattern signal generating circuit 15. In this example, input terminals 17, 18 and 19 receive respectively the capstan FG signal from the frequency signal generator 12, the CTL signal from the CTL head 9 and the HSW signal from the rotation phase detector 6. A binary counter 20 counts the capstan FG signal coming from the terminal 17 and to be reset by the CTL signal coming from the terminal 18. A timing signal generating circuit 21 receives the HSW signal from the terminal 19 and generates a timing signal which is synchronized with the HSW signal. A presettable binary counter 22, which is preset by the timing signal of the timing signal generating circuit 21 with the output of the counter 20, is preset there as a preset datum PD and counts the capstan FG signal coming from the terminal 17. A digital-to-analog (hereinafter called D/A) converter 23 D/A converts the output of the counter 22 and produces a first pattern signal. Reference numeral 25 identifies an adder An output terminal 26 produces a conversion element controlling pattern signal (or a driving signal) which is produced from the adder 25. An oscillator 27 generates clock pulses of a predetermined frequency. A counter 28 counts the clock pulses generated by the oscillator 27 and to be reset by the timing signal produced from the timing signal generating circuit 21. Another D/A converter 29 D/A converts the output of the counter 28. The output of the counter 22 relates to a record bearing medium (or tape) moving speed while that of the other counter 28 is not relative to the tape 1 moving speed. The D/A converter 29 thus produces a fixed pattern signal (or a second pattern signal) for still picture reproduction.

Referring to FIGS. 3(a) to 3(g) an 4(A) and 4(B), the following description deals with the special reproducing operations of the VTR described above, emphasizing the operation of the pattern signal generating circuit 15 of FIG. 2.

FIGS. 3(a) to 3(g) jointly form a timing chart showing the ideal wave forms of outputs of the various parts shown in FIG. 2. Among these figures, FIGS. 3(d) to 3(g) show respectively the output wave forms obtained in the event of 1.5 times increased speed reproduction including the CTL signal, the output of the counter 20 of FIG. 2, the output of the presettable counter 22 (or the D/A converter 23) of FIG. 2 and the output of the adder 25. The timing chart of FIGS. 3(a) to 3(g) shows ideal outputs assuming that the frequency of the capstan FG signal is extremely high. FIGS. 4(A) and 4(B), respectively, show the relations of the loci of the scanning centers of the heads 2A and 2B to the loci of the center of the recording tracks on the tape 1 obtained in the event of still picture reproduction and 1.5 times increased speed reproduction.

First, with the heads 2A and 2B rotated by the head motor 5, the rotation phase detector 6 produces the HSW signal which is as shown in FIG. 3(a). Then, the timing signal generating circuit 21 included in the pattern signal generating circuit 15 shown in FIG. 2 produces the timing signal which is synchronized with the rise and fall of the HSW signal, as shown in FIG. 3(b). The D/A converter 29 produces a still pattern signal as shown in FIG. 3(c) shifting the heads 2A and 2B continuously a number of degrees corresponding to a 0 to 1 track pitch (hereinafter called TP) within a one field scanning range. When a so-called field still picture reproducing operation is to be performed, by reproducing alternately with the two heads 2A and 2B a field signal recorded in one recording track by a recording head of the same azimuth angle as that of the reproducing heads 2A and 2B, the relations of the loci of the scanning centers of the heads 2A and 2B to the recording track on the tape 1 become as shown in FIG. 4(A). In FIG. 4(A), full lines represent the center loci "a" of recording tracks of a field signal recorded by a recording head having the same azimuth angle as the heads 2A and 2B. Broken lines represent the center loci "b" of a field signal recorded by a recording head having a different azimuth angle from that of the heads 2A and 2B. A double line arrow represents the center locus "c" of a scanning performed by the heads 2A and 2B. Reference symbol CTL identifies the recording loci of the CTL signal (in FIG. 4(B) also). As shown, the scanning center locus "c" of the heads 2A and 2B (hereinafter called the head locus) becomes a line segment diagonally connecting the starting end of the center locus "a" of the track to be reproduced (hereinafter called the track locus) with the terminating end of the locus of an adjacent track on the left-hand side. It is necessary to adjust the head locus "c" to the track locus "a" for correcting this deviation. For this adjustment, assuming that the traveling direction of the tape 1 for recording is "+" and a reverse direction thereto is "−", the heads 2A and 2B must be continuously shifted a number of degrees corresponding to track pitch values from 0 to −1 TP within a one field scanning range. Therefore, with the D/A converter 29 of FIG. 2 converting the output of the counter 28 into a still pattern signal as shown in FIG. 3(c), the heads 2A and 2B can be satisfactorily shifted for still picture reproduction.

The capstan FG signal produced from the frequency signal generator 12 accordingly, as the capstan 10 is rotated the capstan motor 11, is supplied to the counters 20 and 22, which are included in the pattern signal generating circuit 15 shown in FIG. 2. The counters 20 and 22 count the pulses of the capstan FG signal. Then, since the counter 20 is reset by the CTL signal coming from the CTL head 9 for every frame portion of the tape 1, the upper limit of the count output of the counter 20 corresponds to +2 track pitches (TP). In the event of 1.5 times increased speed reproduction, since the CTL signal becomes as shown in FIG. 3(d), the count output of the counter 20 becomes as shown in FIG. 3(e). For the adder 25, the presettable counter 22 counts the pulses of the capstan FG signal while having the above-stated output of the counter 20 preset at that location by the timing signal (FIG. 3(b)) from the timing signal generating circuit 21 at every point in time when the timing signal is produced. Therefore, the count output of the counter 22, i.e. the output of the D/A converter 23, becomes as shown in FIG. 3(f) in the event of 1.5 times increased speed reproduction. Accordingly, the adder 25 adds the output of the D/A converter 23 and that of the still pattern generator 24 obtained at the above-stated point of time, together. As a result, the adder 25 produces a pattern signal as shown in FIG. 3(g).

In the case of 1.5 times increased speed reproduction, the head locus of the heads 2A and 2B in relation to the track locus on the tape 1 becomes as shown in FIG. 4(B). In FIG. 4(B), reference symbols A1, A2, A3, ---identify head loci of the head 2A; B1, B2, B3, --- those of the head 2B; and a1, a2, a3, --- track loci of the field tracks recorded by a recording head of the same azimuth angle as that of the heads 2A and 2B. For a first field, the head 2A must be continuously shifted to a degree corresponding to track pitch values from 0 to +0.5 TP within the first field scanning range in order to adjust the head locus A1 to the track locus a1. For a second field, the head 2B must be continuously shifted to a degree from +1.5 TP to +2 TP within the second field scanning range in order to adjust the head locus B1 to the track locus a1. For a third field, the head locus A2 must be adjusted to the next track locus a2 by continuously shifting the head 2A to a degree from +1 TP to +1.5 TP within the third field scanning range. For a fourth field, the head locus B2 must be adjusted to the track locus a3 by continuously shifting the head 2B to a degree from +0.5 TP to +1 TP within the fourth field scanning range. It will be understood that the pattern signal of FIG. 3(g) is adequate for shifting the heads 2A and 2B in the above-stated manner.

In the foregoing, the pattern signal of the conventional apparatus for a 1.5 times increase in speed reproduction has been described by way of examples. However, the pattern signal generating circuit 15 is capable of giving not only the pattern signal described but also other pattern signals for controlling the heads 2A and 2B in manners suited for different reproducing speeds other than a speed increased by 1.5 times.

The pattern signal thus produced from the pattern signal generating circuit 15 is supplied to the conversion element driving circuit 16. The driving circuit 16 then drives the piezoelectric conversion elements 3A and 3B bringing the heads 2A and 2B to the track to be reproduced.

The conventional apparatus is thus arranged as above to produce a noiseless reproduced video signal at an arbitrary reproducing speed by obtaining the pattern signal for driving the shifting means to shift the piezoelectric conversion elements 3A, 3B, or the like. In actuality, however, the outputs of the counters 29, 20 and 22 shown in FIGS. 3(c), 3(e) and 3(f) deviate from the linear forms shown. Wave forms close to those shown in FIGS. 3(c), etc. could be obtained if the number of pulses of the capstan FG signal per unit time is infinitely great and the oscillating frequency of the oscillator 27 is extremely high. However, the number of pulses of the capstan FG signal actually generated per unit field (or a period during which the record bearing medium is shifted an extent corresponding to one TP) is limited to a number between several to ten odd by arrangement of the capstan 10 resulting from efforts exerted to reduce the size of the apparatus and to increase recording density. Accordingly, the actual outputs of the counters 20 and 22 include small stepwise variations. In the event of a mode in which the record bearing medium moving speed is low, such as a speed used for slow motion reproduction in particular, the number of pulses of the capstan FG signal generated per unit time is extremely small and thus may be counted only two or three times per turn of the rotary head.

FIGS. 5(a) to 5(g) show in a timing chart the actual output wave forms of the various parts of FIG. 2. This timing chart also shows the operation for a 1.5 times increase in speed reproduction. In this instance, four pulses of the capstan FG signal are obtained with the magnetic tape, moved an extent corresponding to one interval of the CTL signal. In other words, the frequency of the capstan FG signal to be supplied to the input terminal 17 is 180 Hz. Furthermore, for the sake of a simplified illustration, the timing chart is based on the assumption that the oscillation frequency of the oscillator 27 is 180 Hz and that the phase of the capstan FG signal and that of the output of the oscillator 27 are in synchronization with each other.

As is apparent from FIGS. 5(a) to 5(g), the driving pattern signal changes stepwise. Generally, the conversion element driving circuit 16 includes a low-pass filter (hereinafter called LPF), which filters the signal produced from the adder 25. Therefore, a certain degree of such stepwise changes can be somewhat corrected through the filter LPF. However, in cases where the number of pulses of the capstan FG signal generated per unit time is very small, as mentioned above, the stepwise changes inevitably remain in the driving pattern signal. In such a case, it becomes almost impossible to accurately trace the recording tracks. Also, the stepwise changes have caused a ringing of the shifting means such as the piezoelectric conversion elements 3A, 3B, or the like, to hinder adequate tracing of the heads 2A, 2B. To prevent this, it is conceivable to arrange an extensively low cut-off frequency of the filter LPF of the conversion element driving circuit 16. In that instance, however, the shape of the driving pattern signal will deviate greatly from the ideal shape of the pattern signal as shown in FIG. 3. Its phase also deviates greatly from the original phase.

Furthermore, in driving the rotary head shifting means with the above-stated driving pattern signal, the positional deviation which is called tracking deviation and which generally arises between the recording track and the rotary head 2A, 2B during normal reproduction (made at the same tape speed as the tape speed used for recording) also arises in that case. In the conventional VTR of the type mentioned above, the reproduced CTL signal is used for correction of a tracking error (hereinafter simply called tracking). However, this method requires a period of time for having the magnetic tape 1 travel at least one frame before such a correction can be effected and, thus, has been incapable of instantly performing tracking. In the event of slow motion reproduction in particular, the intervals at which the reproduced CTL signal is obtainable become long as the tape 1 is moved at a low speed. Therefore, an extremely long period of time has been required for tracking.

Meanwhile, as a result of reduction in size of VTR's during recent years, there have been proposed VTR's of the kind wherein, instead of recording the CTL signal, pilot signals of different frequencies are respectively recorded on recording tracks; and tracking is carried out with a tracking control signal (hereinafter called an ATF signal) obtained by reproducing these pilot signals. In the VTR of this kind, however, in carrying out varied speed reproductions with the shifting means as described above, tracking is uncontrollable until the reproducing head 2A, 2B actually traces the track because there is no CTL signal provided. Therefore, although the center line of the recording track and the tracing locus of the reproducing rotary head 2A, 2B are parallel with each other, they deviate from each other in the direction of travel of the medium at the initial stage of the varied speed reproduction.

Generally, the capstan 10 is controlled by means of the ATF signal after commencement of tracing. However, a certain length of time is necessary for following the recording track. To solve this problem, therefore, the ATF signal may conceivably be added to the driving pattern signal in the event of varied speed reproduction. However, the ATF signal cannot be obtained until the reproducing rotary head 2A, 2B begins to trace the tape 1. In a case where the tracing locus of the reproducing head 2A, 2B is always deviating in the fixed direction from the recording track as mentioned above, tracking must be performed every time a track is traced and thus the shifting means is driven with the ATF signal immediately after tracing commences. In this manner, stable operation of the shifting means is hardly possible. Besides, since tracking is not performed at the beginning of tracing, a reproduced image thus obtained deteriorates.

It is an object of this invention to provide a rotary head type reproducing apparatus which is capable of solving some of or all of the above-stated problems.

It is another object of the invention to provide a rotary head type reproducing apparatus wherein there is provided shifting means for shifting the rotary head in a direction which crosses the rotating plane thereof with a control signal which is in close proximity to an ideal analogously varying control signal, so that recording tracks can be accurately traced without increasing the precision of the structural arrangement of moving means, including the capstan 10, etc.

It is a further object of this invention to provide a rotary head type reproducing apparatus which is capable of performing stable and quick tracking, regardless of the moving speed of the record bearing medium with the shifting means shifting the rotary head in a direction which crosses the rotating plane thereof.

These and further objects and features of the invention will become apparent from the following detailed description of the preferred embodiments thereof, taken in conjunction with the accompanying drawings.

SUMMARY OF THE INVENTION

To accomplish the first object of the invention, a rotary head type reproducing apparatus embodying an aspect of this invention reproduces a recorded signal by having the rotary head trace many recording tracks formed at a predetermined pitch on a record bearing medium one after another, comprising: moving means for moving the record bearing medium in a direction which crosses the recording tracks; shifting means for shifting the rotary head in a direction which crosses the rotating plane thereof; first pulse signal generating means for generating a first pulse signal in association with the record bearing medium moving action of the moving means; second pulse signal forming means for forming a second pulse signal on the basis of the first pulse signal, the second pulse signal being of a high frequency than the first pulse signal; counting means for counting the second pulse signal; and control means which forms a control signal for controlling the shifting means on the basis of the counted value obtained from the counting means.

To attain the second object of the invention, a rotary head type reproducing apparatus embodying an aspect of the invention reproduces a recorded signal by having the rotary head trace many recording tracks formed at a predetermined pitch on a record bearing medium one after another comprising: moving means for moving the record bearing medium in a direction which crosses the recording tracks; shifting means for shifting the rotary head in a direction which crosses the rotating plane thereof; first signal generating means for generating a first signal having a voltage related to the record bearing medium moving action of the moving means; second signal generating means for generating a second signal having a voltage corresponding to a tracking error arising between the rotary head and the recording track; third signal generating means having a frequency corresponding to the voltage of the first signal and that of the second signal; and control means which forms a control signal for controlling the shifting means on the basis of the third signal.

BRIEF DESCRIPTION OF THE DRAWINGS

FIGS. 3(a) to 3(g) show ideal output wave forms of various parts of FIG. 2.

FIGS. 5(a) to 5(g) show actual output wave forms of various parts of FIG. 2.

FIGS. 7(a) to 7(g') show output wave forms of various parts of FIG. 6.

FIGS. 9(a) to 9(g') show output wave forms of various parts of FIG. 8.

FIG. 14 is a block diagram showing the arrangement of essential parts of a VTR in still another embodiment of the invention.

FIGS. 15(i) to 15(v) show output wave forms of various parts of FIG. 15, as in their initial states.

DETAILED DESCRIPTION OF THE PREFERRED EMBODIMENTS

Figure 2:
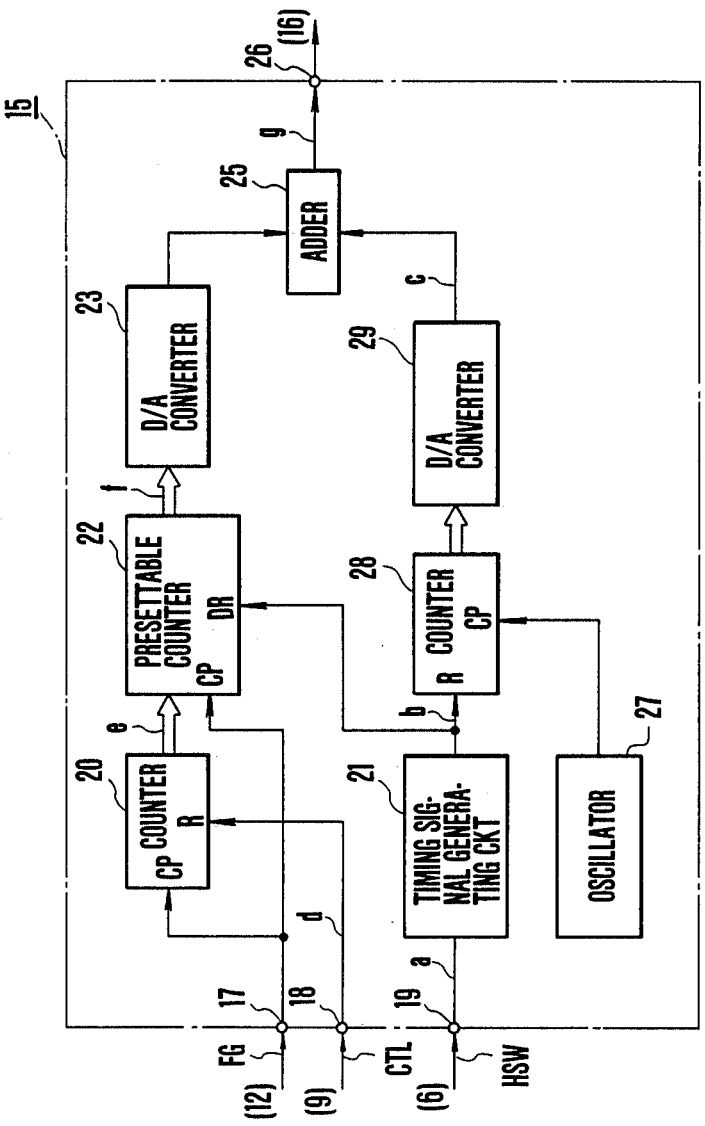
FIG. 2 is a diagram showing, by way of example, a pattern signal generating circuit of the VTR shown in FIG. 1.
Figure 4A:
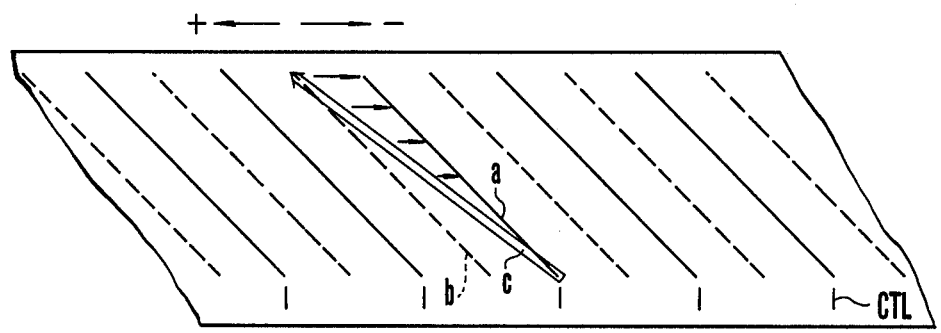
FIGS. 4(A) and 4(B) show the relationship between recording tracks formed on a tape and scanning by heads which are obtained respectively in the event of still picture reproduction and a 1.5 times increase in speed reproduction.
Figure 4B:
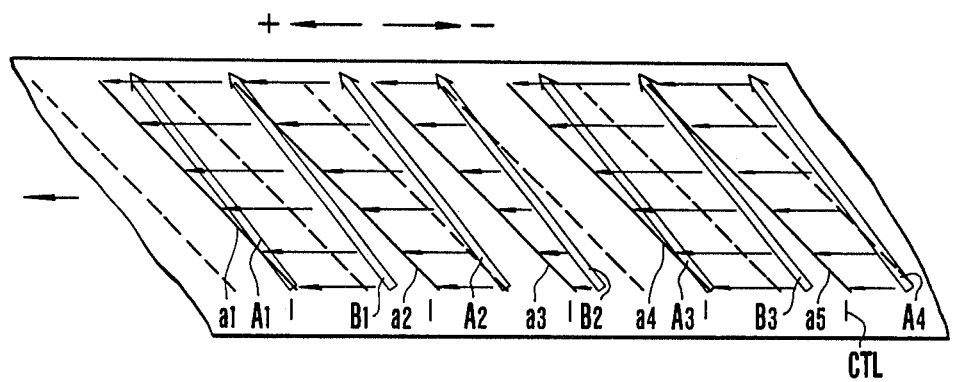
Figure 6:
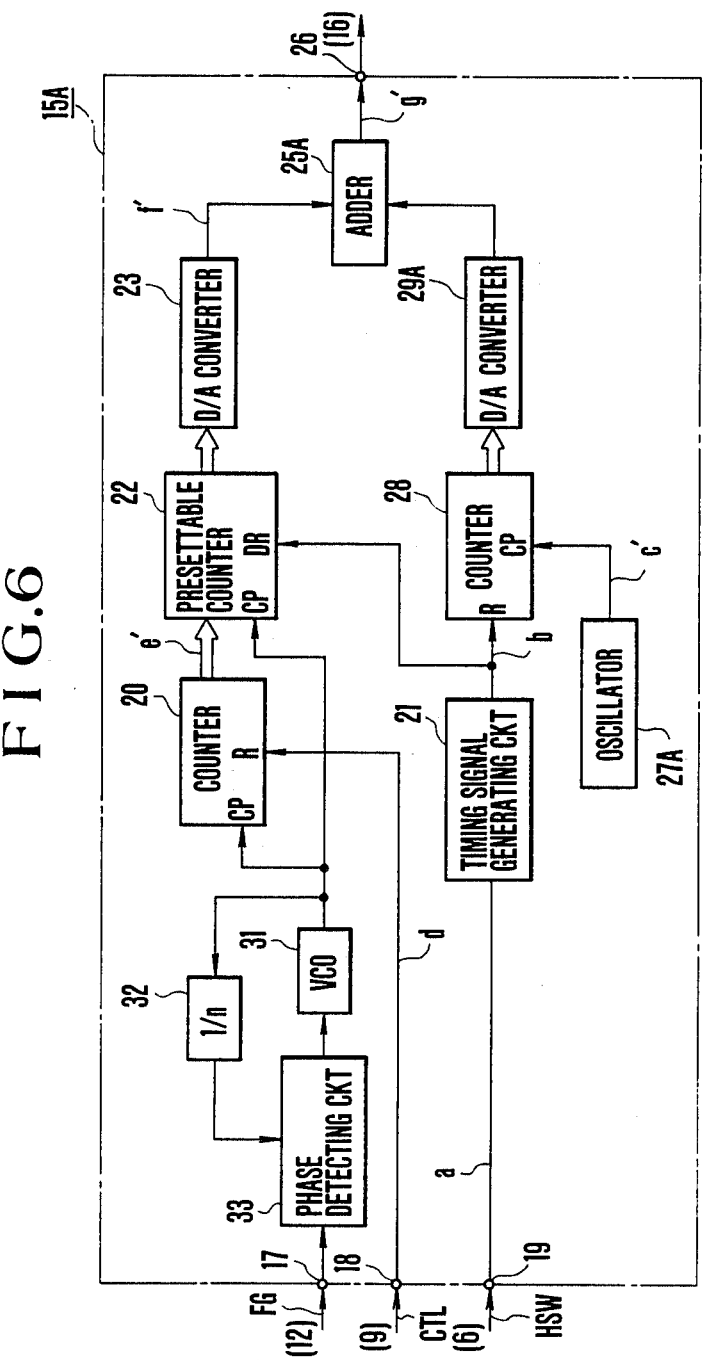
FIG. 6 is a block diagram showing the arrangement of essential parts of a VTR in an embodiment of the present invention.

The following description gives examples wherein the present invention is applied to VTR's of the kind described in the foregoing:

FIG. 6 shows, in a block diagram, the essential component parts of a VTR in an embodiment of the invention. In FIG. 6, parts which are similar to those shown in FIG. 2 are indicated by the same reference numerals and are omitted from the description given here. The embodiment includes a voltage controlled oscillator 31 (hereinafter called VCO); a frequency divider 32 which divides the output frequency of the VCO into 1/n; and a phase detecting circuit 33 which compares the phase of the capstan FG signal supplied to the terminal 17 with that of the output of the frequency divider 32. Also provided is an oscillator 27A which has a higher oscillation frequency than that of the oscillator 27 of FIG. 2. The embodiment is further provided with a D/A converter 29A which D/A converts the output of the counter 28 obtained by counting the output of the oscillator 27A and produces a still pattern signal which is described in the foregoing.

The embodiment operates as follows: The output of the VCO 31 is frequency divided by the 1/n frequency divider 32 and is then supplied to the phase detecting circuit 33. The circuit 33 compares the phase of the capstan FG signal received from the terminal 17 with that of the signal produced from the 1/n frequency divider 32. The VCO 31 is controlled on the basis of an error voltage obtained through phase comparison. These elements constitute a phase locked loop (PLL). The VCO 31 thus gives a pulse signal (a second pulse signal) which is phase synchronized with the capstan FG signal (a first pulse signal) and is of a frequency "n" times as high as the first pulse signal. In other words, the frequency of the capstan FG signal is increased by "n" times with the frequency dividing ratio of the frequency divider 32 set at 1/n. Then, the frequencies of the pulse signals counted by the counter 20 and the presettable counter 22 can be increased by "n" times.

Figure 7:
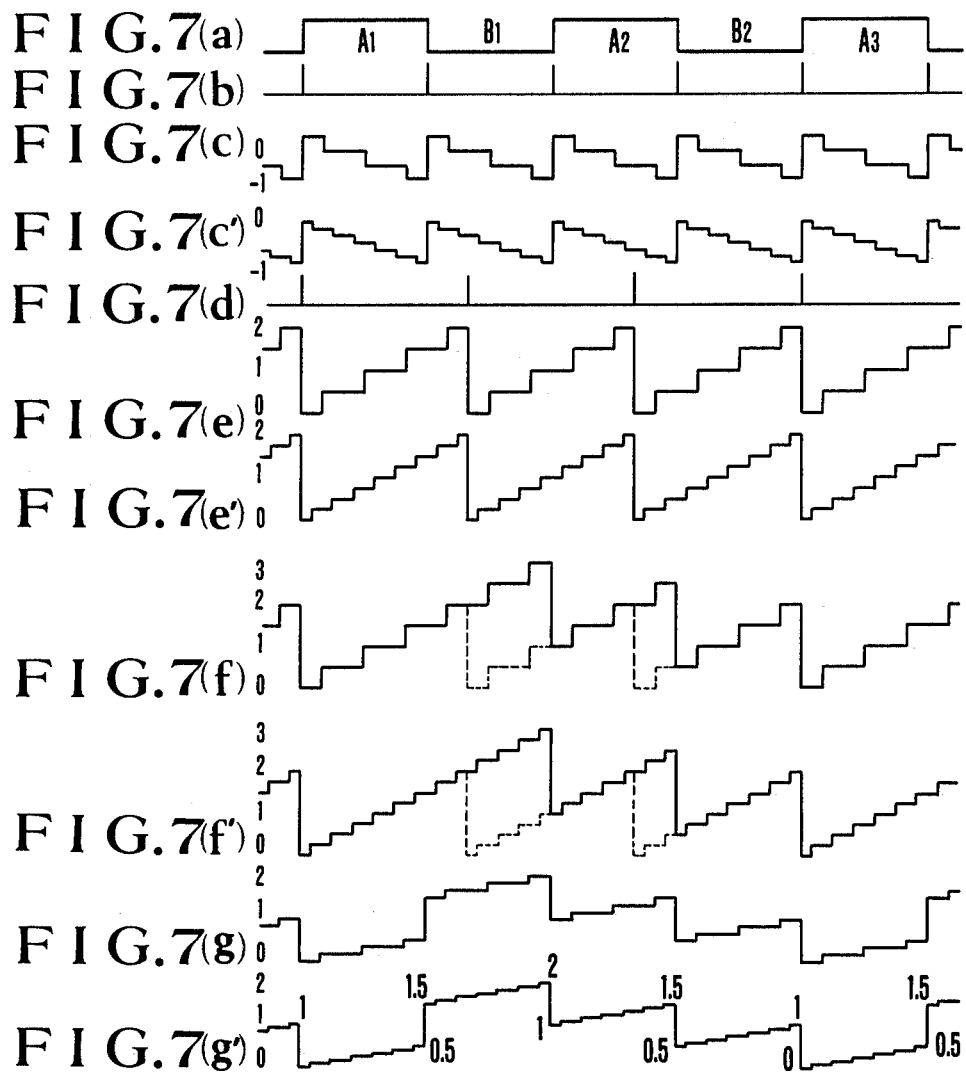

FIGS. 7(a) to 7(g') show the output wave forms of the parts a–g, c' and e'–g' of FIGS. 2 and 6 in a timing chart. The timing chart is for a 1.5 times increase in speed reproduction in which four pulses of the capstan FG signal are obtained when the magnetic tape 1 is moved an extent of each interval of the CTL signal. In other words, in this instance, the frequency of the capstan FG signal supplied to the input terminal 17 is 180 Hz. Furthermore, the timing chart is given on the assumption that the center frequency of the output of the VCO 31 is 360 Hz and the frequency dividing ratio of the frequency divider 32 is set at ½. Furthermore, for the sake of a simplified illustration, the oscillation frequency of the oscillator 27 is assumed to be 180 Hz; that of the oscillator 27A to be 360 Hz; and the phase of the pulse output of the VCO 31, that of the output of the oscillator 27A, that of the capstan FG signal and that of the oscillator 27 are also assumed to be the same.

As is apparent from the timing chart wave forms of FIGS. 7(g) and 7(g'), the signal produced from an adder 25A of FIG. 6 as represented by FIG. 7(g') closely resembles the ideal driving pattern signal shown in FIG. 3(g). Compared with the output obtained by directly counting the pulses of the capstan FG signal as shown in FIG. 7(g), the wave form of the output of the adder 25A is smoother. Therefore, the recording tracks can be more accurately traced with this signal than with the conventional driving pattern signal. Furthermore, the cut-off frequency of the LPF included in the conversion element driving circuit 16 can be set at a high value. Therefore, the phase delay of the driving pattern signal relative to the original phase is lowered to reduce track deviation. Another advantage of the embodiment is that the smoother driving pattern signal also reduces the possibility of mechanical resonance or ringing, which tends to occur in the shifting means for the piezoelectric conversion element 3A, 3B.

Figure 8:
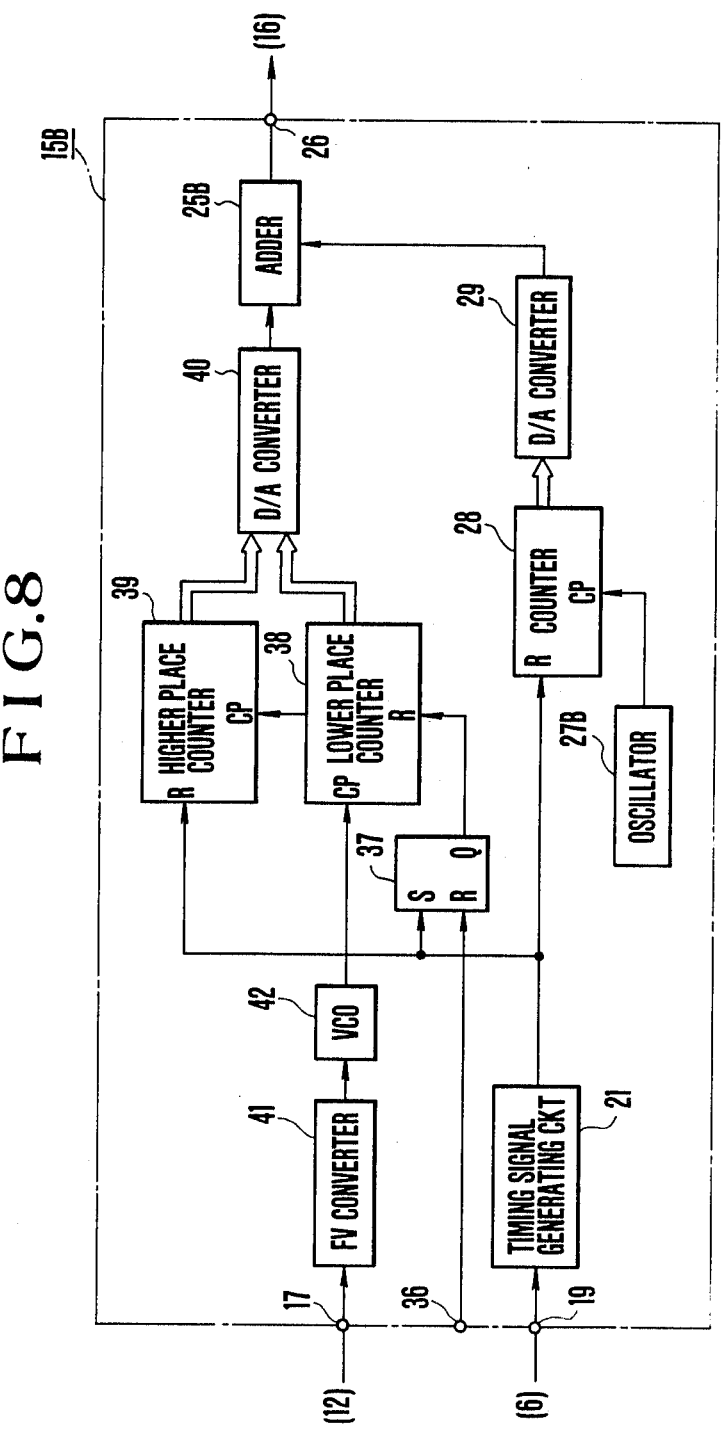
FIG. 8 shows the arrangement of essential parts of a VTR in another embodiment of the invention.

FIG. 8 shows essential component parts of a VTR arranged in another embodiment of the invention. The VTR of this embodiment is of the type performing a tracking operation by having pilot signals superimposed on a video signal instead of using the CTL signal. In FIG. 8, elements similar to those shown in FIG. 6 are indicated by the same reference numerals. What is shown in FIG. 8 is another example of a pattern signal generating circuit employed in place of the pattern signal generating circuit 15 of FIG. 1. In FIG. 8, the whole of the pattern signal generating circuit is identified by a reference numeral 15B. Referring to FIG. 8, an input terminal 36 receives a power-up-clear pulse (PUC) which will be described later herein. An RS flip-flop 37 is reset by the pulse PUC and is set by the rise of a timing signal produced from the timing signal generating circuit 21. A lower place binary counter 38 counts the pulses of the capstan Fg signal coming from the input terminal 17. The counter 38 produces an overflow signal (hereinafter called the OF signal) when one frame portion, i.e. 2 TP portion of the output of a VCO 42 related to the capstan FG signal is counted and is then reset or returns to zero by itself. The Q output of the flip-flop 37 is supplied to the reset input terminal of the lower place counter 38 to keep the counter 38 reset as long as the reset input is at a high level. When the reset input becomes a low level, the counter 38 counts thereby. A higher place binary counter 39 counts the OF signal coming from the lower place counter 38. A D/A converter 40, which is similar to the D/A converter 23 of FIG. 6, receives the count output of the lower place counter 38 as a lower place binary datum and that of the higher place counter 39 as a higher place binary datum D/A converts a composite count value thus obtained. A frequency-to-voltage (hereinafter called FV) converter 41 FV converts the capstan FG signal supplied to the input terminal 17. A VCO has its oscillation frequency change as the output voltage of the FV converter 41 changes. The oscillation frequency of the VCO 42 is set at a much higher value than the frequency of the capstan FG signal. Reference numeral 27B identifies a high frequency oscillator.

Figure 10A:
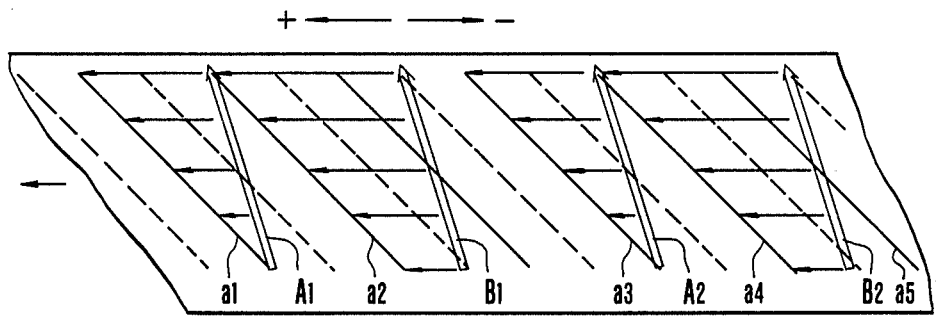
FIGS. 10(A) and 10(B) show the relationship between recording tracks formed on a tape, and scanning by heads which are obtained in the event of reproducing operations respectively performed at three times the increased speed and at a 0.6 speed.
Figure 10B:
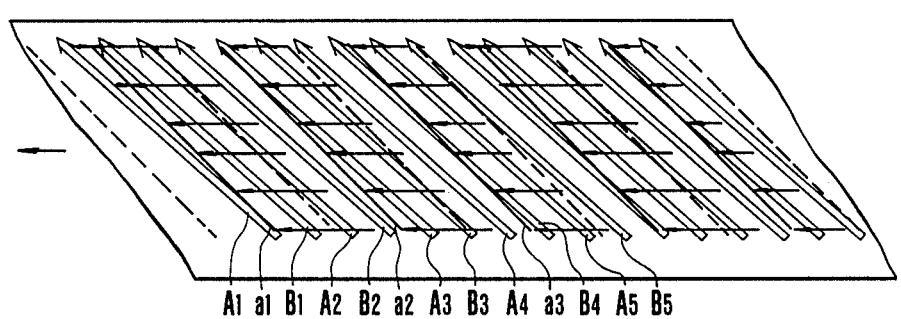

Referring to FIGS. 9(a) to 9(g-3) and 10(A) and 10(B), the pattern signal generating circuit 15B which is arranged as described above operates as follows: The wave form of the count output of the lower place counter 38, the count output of the higher place counter 39, the composite count output of the counters 38 and 39 (or that of the outputs of the D/A converter 40) and the output of an adder 25B are as shown respectively in FIGS. 9(d-1) to 9(g-1) in the event of a 1.5 times increase in speed reproduction; as shown in FIGS. 9(d-2) to 9(g-2) in the event of a three times increase in speed reproduction; and as shown in FIGS. 9(d-3) to 9(g-3) in the event of a 0.6 speed reproduction. FIGS. 10(A) and 10(B) show the relationship of the center loci of scanning performed by the heads 2A and 2B to the center loci of the recording tracks obtained in the event of the three times increase in speed reproduction and the 0.6 speed reproduction, respectively.

With the power supply of the apparatus switched or with the apparatus set in a reproduction mode, the flip-flop 37 is reset. The level of the $\overline{Q}$ output of the flip-flop 37 becomes high to keep the lower place counter 38 reset. The head motor 5 then begins to rotate the heads 2A and 2B. Following this, when the HSW signal which is as shown in FIG. (a) is produced from the rotation phase detector 6, the timing signal generating circuit 21 produces a timing signal in synchronization with the rise and fall of the HSW signal as shown in FIG. 9(b) in the same manner as with the timing signal generating circuit 15 of FIGS. 2 and 6. With the timing signal produced, the first part of the signal sets the flip-flop 37 to make the $\overline{Q}$ output level of the flip flop 37 low. This releases the lower place counter 38 from the reset state and allows it to count the pulses of the signal produced from the VCO 42 thereafter. Meanwhile, the higher place counter 39 is reset every time the timing signal is produced.

The output signal of the VCO 42 is obtained by taperedly multiplying the capstan FG signal. Therefore, the number of pulses generated by the VCO 42 can be found from the number of pulses of the capstan FG signal generated at a point of 2 TP. Therefore, as mentioned above, the lower place counter 38 produces the OF signal at a point of time when a number of generated pulses of the VCO 42 corresponding to 2 TP, have been received. With the OF signal produced, the lower place counter 38 is reset by itself or returns to zero at the same time. The count output of the lower place counter 38 thus becomes as shown in FIG. 9(d-1) in the event of a 1.5 times increase in speed reproduction, as shown in FIG. 9(d-2) in the event of a three times increase in speed reproduction, and as shown in FIG. 9(d-3) in the event of a 0.6 speed reproduction. Then, the count output of the higher place counter 39 which counts the OF signal coming from the lower place counter 38 becomes as shown in FIG. 9(e-1) in the event of a 1.5 times speed reproduction, as shown in FIG. 9(e-2) in the event of a three times increase in speed reproduction, and as shown in FIG. 9(e-3) in the event of a 0.6 speed reproduction. As a result, the composite count output of these counters 38 and 39, or the output of the D/A converter 40, becomes as shown in FIG. 9(f-1) in the event of a 1.5 times increase in speed reproduction, as shown in FIG. 9(f-2) in the event of a three times increase in speed reproduction, and as shown in FIG. 9(f-3) in the event of a 0.6 speed reproduction.

As described above, the pulses of the capstan FG signal are not directly counted but are counted after the signal is FV converted and then further converted into a pulse signal of a higher frequency. This arrangement of the embodiment gives ideal count outputs as shown in FIGS. 9(a) to 9(g-3).

Meanwhile, the oscillator 27B oscillates and produces pulses of a predetermined high frequency. The counter 28 counts the high frequency pulses. The counter 28 is reset by the timing signal. Then, a still pattern signal which is in-phase with the fixed pattern signal produced from the D/A converter 40 is obtained. As shown in FIG. 9(c), this still pattern signal causes the heads 2A and 2B to be continuously shifted a degree corresponding to the track pitch values from 0 to −1 TP, within their scanning range for one field. Since the pulse output of the oscillator 27B is of a high frequency, this still pattern signal varies smoothly and is thus close to an ideal pattern.

The adder 25B adds the output of the D/A converter 40 and the output of the still pattern signal generator 24 together. As a result of this addition, the output of the adder 25B becomes a pattern signal as shown in FIG. 9(g-1) in the event of a 1.5 times increase in speed reproduction, as shown in FIG. 9(g-2) in the event of a 3 times increase in speed reproduction, and as shown in FIG. 9(g-3) in the event of a 0.6 speed reproduction.

The pattern signal for a 1.5 times increase in reproduction, as shown in FIG. 9(g-1), is equivalent to the pattern signal shown in FIG. 3(g) and is mentioned in the foregoing. It is therefore apparent that the pattern signal is satisfactory for shifting the heads 2A and 2B in carrying out a 1.5 times increase in speed reproduction.

Again referring to FIGS. 10(A) and 10(B), the operation of the embodiment for a three times increase in speed reproduction and a 0.6 speed reproduction is as follows: First, in the case of the three times increase in speed reproduction, the head loci of the heads 2A and 2B relative to the track loci of the recording tracks on the tape 1 become as shown in FIG. 10(A). In FIG. 10(A) (and also in FIG. 10(B)), reference symbols A1, A2, A3, --- identify the head loci of the head 2A; B1, B2, B3, --- the head loci of the other head 2B; and a1, a2, a3, --- the track loci of field tracks recorded by a recording head of the same azimuth angle as that of the heads 2A and 2B. For a first field, in order to adjust the head locus A1 to the track locus a1, the head 2A must be continuously shifted a degree corresponding to the track pitch values from 0 to +2 within the scanning range for the first field. For a second field, the head locus B1 must be adjusted to the next track locus a2 by continuously shifting the head 2B from +1 TP to +3 TP within the scanning range for the second field. These processes must be repeated in a 2 field cycle period. The pattern signal shown in FIG. 9(g-2) satisfies the requirement for shifting the heads 2A and 2B in the above-stated manner.

In carrying out reproduction at the 0.6 speed, the head loci of the heads 2A and 2B in relation to the track loci on the tape 1 become as shown in FIG. 10(B). For the first field, the head locus A1 must be adjusted to the track locus a1 by continuously shifting the head 2A a degree corresponding to the track pitch values from 0 to −0.4 TP within the scanning range for the first field. For the second field, the head locus B1 must also be adjusted to the track locus a1 by continuously shifting the head 2B from +0.6 TP to +0.2 TP within the second field scanning range. For a third field, the head locus A2 must be adjusted to the track locus a1 by continuously shifting the head 2A from +1.2 TP to +0.8 TP within the third field scanning range. For a fourth field, the head locus B2 must be adjusted to the track locus a1 by continuously shifting the head 2B forward +1.8 TP to +1.4 TP within the fourth field scanning range. For a fifth field, the head locus A3 must be adjusted to the next track locus a2 by continuously shifting the head 2A from 0.4 TP to 0 within the fifth field scanning range. For a sixth field, the head locus B3 must be adjusted to the track locus a2 by continuously shifting the head 2B from +1 TP to +0.6 TP within the sixth field scanning range. For a seventh field, the head locus A4 must be adjusted to the track locus a2 by continuously shifting the head 2A from +1.6 TP to +1.2 TP within the seventh field scanning range. For an eighth field, the head locus B4 must be adjusted to the track locus a3 by continuously shifting the head 2B from +0.2 TP to −0.2 TP within the eighth field scanning range. For a ninth field, the head locus A5 must be adjusted to the track locus a3 by continuously adjusting the head 2A from +0.8 TP to +0.4 TP within the ninth field scanning range. And, for a tenth field, the head locus B5 must be adjusted to the track locus a3 by continuously shifting the head 2B from +1.4 TP to +1 TP within the tenth field scanning range. These shifting and adjusting processes must be repeated in a cycle of 10 field periods. The pattern signal shown in FIG. 9(g-3) evidently satisfies the requirement for shifting these heads 2A and 2B in the above-stated manner.

With the invention applied to a VTR which is not using the CTL signal in the manner as described above, the frequency of the pulse signal to be counted can also be increased. The pattern signal for driving the shifting means, therefore, can be smoothed, permitting accurate tracing on the recording tracks in the event of varied speed reproduction. Furthermore, in the same manner as in the preceding embodiment, the phase delay of the driving pattern signal is also small to lowering the probability of a ringing of the shifting means.

Furthermore, although it is not included in the description of the embodiment given above, a reverse rotating reproducing operation can be satisfactorily carried out by some suitable arrangement such as having the output of the D/A converter 40 inverted before it is added to the output of the other D/A converter 29.

Figure 1:
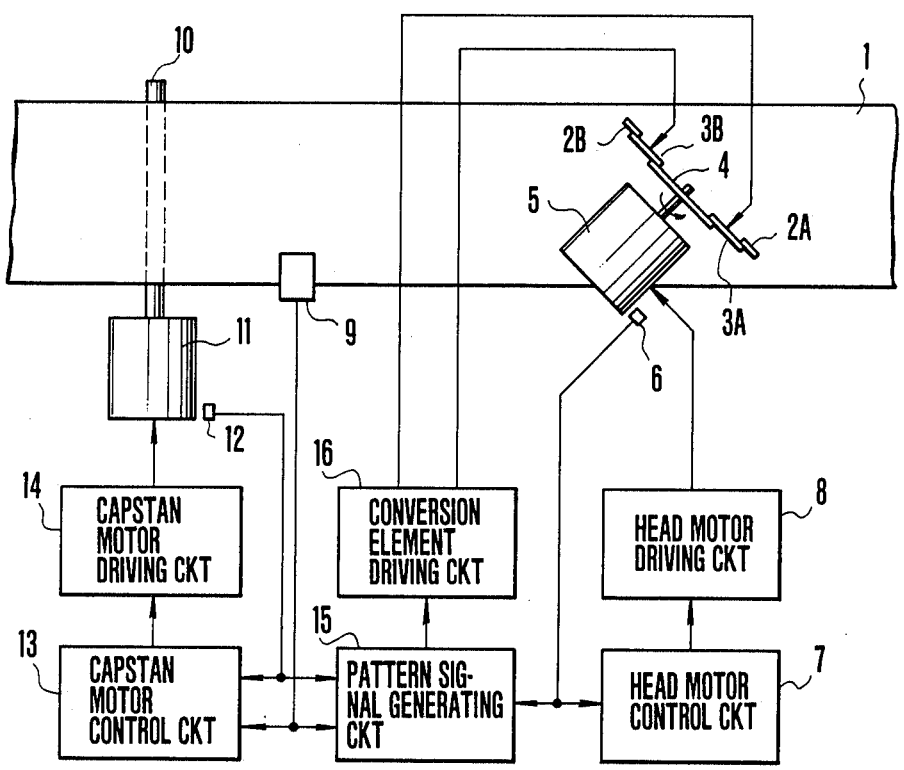
FIG. 1 is a schematic illustration of essential parts of a conventional VTR.
Figure 11:
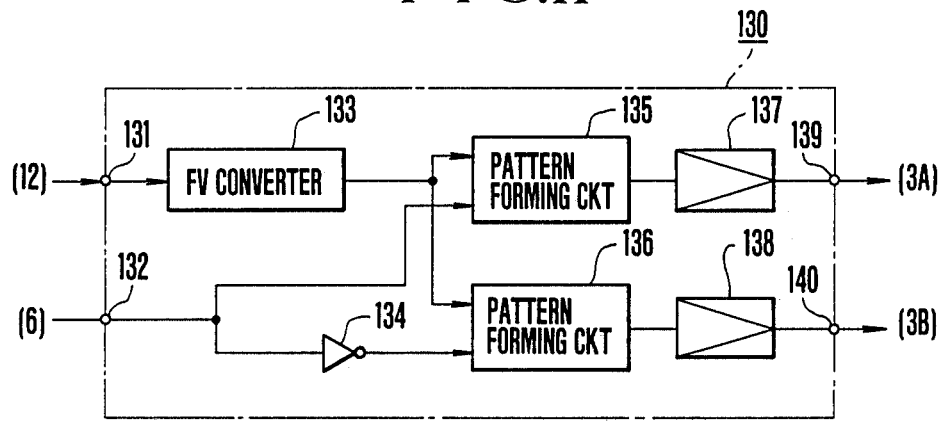
FIG. 11 is a block diagram showing an arrangement of the essential parts of a VTR in a further embodiment of the invention.
Figure 12:
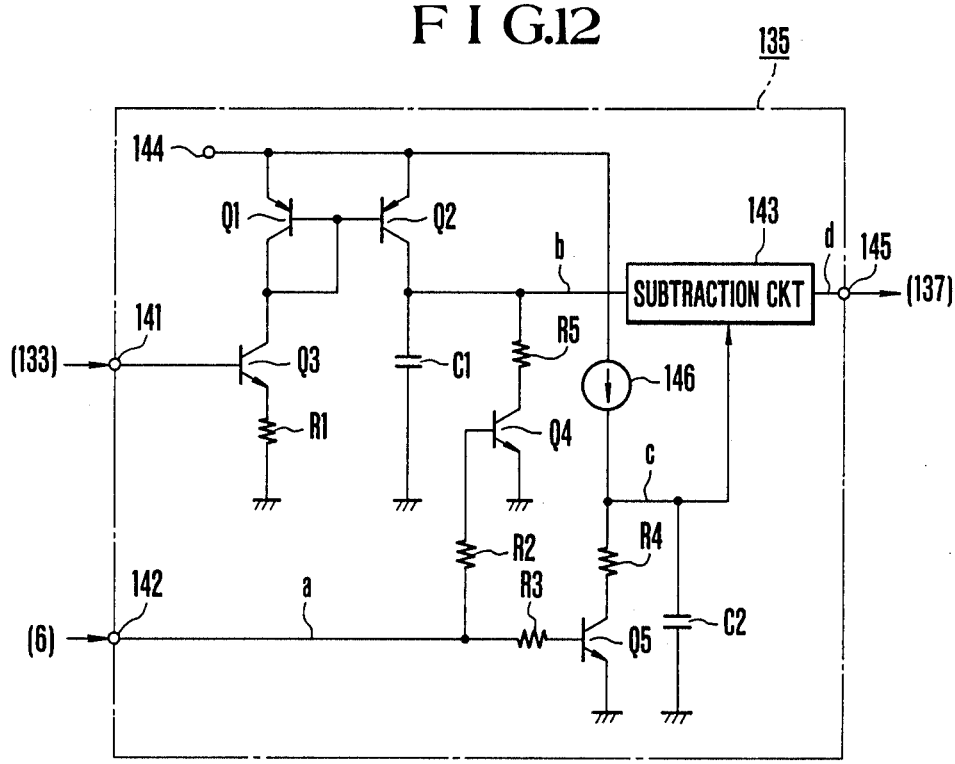
FIG. 12 is a circuit diagram showing, by way of example, the arrangement of a pattern signal forming circuit shown in FIG. 11.

FIG. 11 shows essential parts of a VTR in a further embodiment of the invention. In FIG. 11, a circuit arrangement is capable of performing combined functions including the function of the pattern signal generating circuit 15 and that of the shifting element driving circuit 16 of FIG. 1. With this exception, all other parts are arranged in exactly the same manner as in the VTR of FIG. 1. Referring to FIG. 11, a terminal 131 receives the capstan FG signal from the capstan FG signal generator 12, as shown in FIG. 1. A terminal 132 receives the HSW signal from the rotation phase detector 6, as shown in FIG. 1. An FV converter (frequency-to-voltage converter) 133 FV converts the capstan FG signal supplied to the terminal 131. The circuit arrangement includes an inverter 134; pattern signal forming circuits 135 and 136 which form and supply driving pattern signals to the bimorph elements 3A and 3B according to the output of the FV converter 133; amplifiers 137 and 138; and output terminals 139 and 140 which supply the outputs of the amplifiers 137 and 138 to the bimorph elements 3A and 3B. An example of the detailed arrangement of the pattern signal forming circuit 135 of FIG. 11 is as shown in FIG. 12. The circuit 135 is provided with a terminal 141 which receives a signal produced from the FV converters 133; a terminal 142 which receives the HSW signal mentioned in the foregoing; a subtraction circuit 143; a terminal 144 which receives a power supply voltage Vcc; an output terminal 145 for the amplifier 137; a constant current source 146; NPN transistors Q1, Q4 and Q5; PNP transistors Q2 and Q3; resistors R1 to R5; and capacitors C1 and C2.

FIGS. 13(a) to 13(d) show, in a timing chart, the output wave forms of the parts "a"–"d" indicated in FIG. 12. The operation of the embodiment is as follows: The output of the FV converter 133, which is supplied to the terminal 141, is supplied to the base of the transistor Q3. Then, a current which is approximately I=-Vin/R1 (wherein "Vin" represents the output voltage of the FV converter 133) flows to the resistor R1. A current Miller circuit which is formed by the transistors Q1 and Q2 causes an equal current I to also flow from the collector of the transistor Q2 to charge the capacitor C1 therewith. If the HSW signal "a" is at a low level, the potential difference between the two terminals of the capacitor C1 increases as the capacitor C1 is charged. Assuming that the frequency of the capstan FG signal is "f" and the output voltage of the FV converter 133 is Vin=k·f, the relation obtained is I=-Vin/R1. Then, a potential Vout at a point "b" can be expressed as Vout=(I/C1)t. Therefore, the relation of Vout=(k/C1 R1)·f·t. In other words, the slant at the part P in FIG. 13(b) becomes (k/C1 R1)f. Then, a triangular wave having a slant which is proportional to the frequency of the capstan FG signal can be obtained. Assuming t=(1/60) (sec) in the case of normal reproduction, the "C1", "R1" and "k" are determined in such a manner that "Vout" becomes a voltage required for driving the bimorph element 3A an extent corresponding to 1 TP.

When the level of the HSW signal becomes high, the transistor Q4 turns on. The electric charge of the capacitor C1 is then discharged via the resistor R5. This is as represented by the wave form of a part Q indicated in FIG. 13(b).

As mentioned above, the wave form of the potential Vout at the point "b" of FIG. 12 has a slant which is proportional to the frequency of the capstan FG signal, i.e., the tape speed T (assuming that the tape speed used for recording is 1). However, as is apparent from the foregoing description of the prior art example, the scanning slant by the head relative to the recording track deviates to a value which is proportional to T−1. This deviation requires correction. Therefore, the above-stated still pattern signal is subtracted from the potential of the point "b". This still pattern signal is formed in the following manner.

Figures 13A, 13B, 13C, 13D:
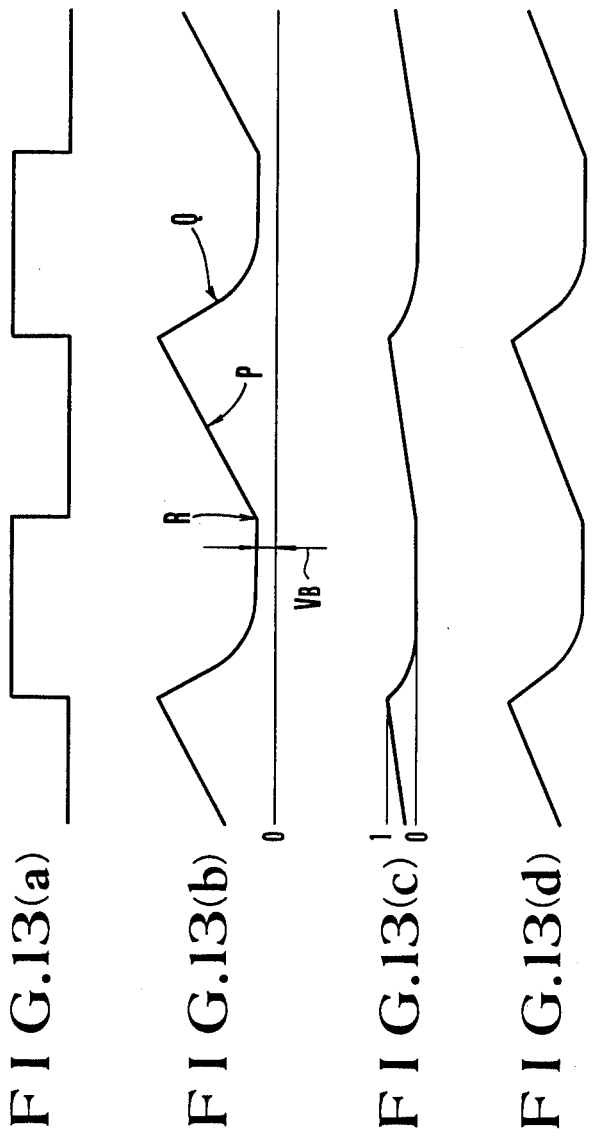
FIGS. 13(a) to 13(d) show output wave forms of various parts of FIG. 12.

The capacitor C2 is charged with a current obtained from the constant current source 146 when the HSW signal "b" is at a low level. Then, the change of a potential at the point "c" becomes a triangular wave having a certain given slant, as shown in FIG. 13(c). Furthermore, since the transistor Q5 turns on when the level of the HSW signal becomes high, the electric charge of the capacitor C2 is discharged via the resistor R4. At that time, a wave form as shown in FIG. 13(c) is obtained. The current of the constant current source 146 is set at such a value that, in this instance, the potential difference between the two terminals of the capacitor C2 becomes a value required for driving the bimorph element 3A a degree corresponding to 1 TP within a period of 1/60 when the capacitor C2 is charged.

Then, with the potential of the point "c" subtracted from the potential of the point "b" by the subtractor 143, a bimorph element driving pattern signal, which has a slant in proportion to the value T−1, is obtained as shown in FIG. 13(d). This signal is amplified by the amplifier 137 before driving the bimorph element 3A.

The HSW signal is inverted by the inverter 134 and the inverted signal is supplied to the pattern signal forming circuit 136. Therefore, the pattern signal forming circuit 136 produces a driving pattern signal differing 180 degrees in phase from the driving pattern signal produced from the other pattern signal forming circuit 135, as mentioned in the foregoing. Then, the other bimorph element 3B is driven by this signal. Therefore, while the magnetic tape 1 is being traced by the heads 2A and 2B, the bimorph elements 3A and 3B are constantly driven by the slant parts of the pattern signals, which are slanting in proportion to the value T−1.

With the VTR arranged as described above, bimorph element driving signals which are analogous, satisfactory and which have no stepwise variations can be obtained by changing the frequency of the capstan FG signal into continuous voltages even when the frequency of the capstan FG signal is low. This arrangement enables the heads 2A and 2B to trace the recording tracks more accurately than in the conventional arrangement using the driving pattern signal including the stepwise voltage variations. Furthermore, since no LPF is used on the output side, no phase delay arises in the driving pattern signals. It is another advantage that the mechanical resonance or ringing of the shifting means or the bimorph elements 3A and 3B can be prevented since there is no stepwise voltage variation.

Further, with the embodiment provided with the charging and discharging circuit, the variations which take place in the voltages impressed on the bimorph elements 3A and 3B immediately before the heads 2A and 2B trace the magnetic tape are moderated to a great extent. Therefore, the mechanical resonance of the bimorph elements can be prevented also at the time of switching the heads. It is a further advantage of the embodiment that, since the driving fixed pattern signal is formed without recourse to the CTL signal, the arrangement of this embodiment is applicable to VTR's of the type which do not record any CTL signal as a result of a recent tendency to increase the recording density.

FIG. 14 shows essential parts of a VTR arranged as still a further embodiment of the present invention. In the drawing, the component elements similar to those shown in FIGS. 8 or 2 are indicated by the same reference numerals and a description of them is omitted in the following. What is shown in FIG. 14 is another example of a pattern signal generating circuit arrangement which can be employed in place of the pattern signal generating circuit 15 of FIG. 1. The pattern signal generating circuit is indicated as a whole by a reference numeral 15C. The circuit includes an ATF signal generating circuit 81 and an adder 83. Under a normal condition, i.e., when the output of the ATF signal generating circuit 81 is zero, the pattern signal generating circuit 15C operates in exactly the same manner as in the case of the pattern signal generating circuit shown in FIG. 8 and, thus, the operation requires no description. In the early stage of reproduction, i.e., when the ATF signal generating circuit 81 produces some output, the pattern signal generating circuit of this embodiment operates as follows. FIGS. 15(i) to 15(v) show in a timing chart the wave forms obtained in the early state of reproduction at parts "i" to "v" indicated in FIG. 14.

Let us assume that, in tracing the magnetic tape for the first time, the head 2A or 2B is deviating as much as $\Delta x$ from the center line of a recording track. The ATF signal generating circuit 81 then produces an ATF signal V$\Delta x$. This causes the output iii of the adder 83 to increase by V'$\Delta x$ corresponding to a degree of correction as shown in FIG. 15(iii). Accordingly, the output iv of the VCO 42 increases its frequency as shown in FIG. 15(iv). Then, the upper place counter 39 and the lower place counter 38 count the output of the VCO 42. The output of these counters comes to have a steeper slant at a part where the ATF signal is added as shown in FIG. 15(v). In FIG. 15(v), a reference symbol "a" denotes an output required for performing ideal tracking. Another tracking symbol "a'" denotes an output with which the head traces the magnetic tape and which is deviating from the center locus of the recording track always by $\Delta x$. As shown in FIG. 15(v), the output which first deviates as much as $\Delta x$ at the beginning of tracing comes closer to an ideal tracking state by gradually approaching the ideal output "a". The output eventually comes to have the same gradient as the ideal output "a". Further, the correction of the deviation $\Delta x$ is performed only in the initial stage of tracing. After that, counter 38 and the ensuing tracing operation is carried out by driving the shifting means with the corrected driving pattern signal. Therefore, the image thus reproduced will never be disturbed.

In accordance with the arrangement of the embodiment described, the track deviation at the beginning of reproduction is promptly corrected by controlling the rotary head shifting means and, after that, the degree of correction is kept at the counter 38 to obviate the necessity of controlling the shifting means for every ensuing process of tracing. This arrangement thus ensures that the reproduced image will never be degraded by the unstable operation of the shifting means.

While the operation of the embodiment has been described above as to be performed in the event of varied speed reproduction, the arrangement of the embodiment is also applicable to a normal reproducing operation to be performed with rotary heads shifted by the shifting means and, in that case, the track deviation at the beginning of reproduction also can be stably and promptly corrected.

What is claimed is:

1. A rotary head type reproducing apparatus for reproducing a recorded signal by having a rotary head trace many recording tracks formed at a predetermined pitch on a record bearing medium one after the other, comprising:
    (a) moving means for moving the record bearing medium;
    (b) shifting means for shifting the rotary head in a direction which crosses the rotating plane thereof;
    first pulse signal generating means for generating a first pulse signal in association with the record bearing medium moving action of the moving means;
    (d) second pulse signal forming means for forming a second pulse signal on the basis of the first pulse signal, the second pulse signal being of a higher frequency than that of the first pulse signal, said second pulse signal forming means including an F-V converter which receives said first pulse signal and generates a voltage corresponding to the frequency thereof and a voltage controlled oscillator which generates said second pulse signal under the control of the voltage generated by said F-V converter;
    (e) mounting means for counting the second pulse signal; and
    (f) control means for forming a control signal to control the shifting means on the basis of the counted value obtained from said counting means.

2. An apparatus according to claim 1, wherein the counted value of said counting means returns to an initial datum every time a predetermined number "n" of the pulses of said second pulse signal are counted; and said control means includes a first counting circuit which counts up every time the counted value of said counting means returns to the initial datum.

3. An apparatus according to claim 2, wherein said control means further includes a circuit which generates a rotation detecting signal synchronized with the rotation of said rotary head; and said first counting circuit is reset according to said rotation detecting signal.

4. An apparatus according to claim 3, wherein said control means further includes an oscillation circuit having a predetermined oscillation frequency; and a second counting circuit which counts the pulses of a pulse signal produced from said oscillation circuit and is reset according to said rotation detecting signal.

5. A rotary head type reproducing apparatus for reproducing a recorded signal by having a rotary head trace many recording tracks formed at a predetermined pitch on a record bearing medium one after the other, comprising:
    (a) moving means including a rotatable member for rotating to move the record bearing medium;
    (b) shifting means for shifting said rotary head in a direction which crosses the rotating plane thereof;
    (c) first signal forming means for forming a first signal having a frequency which is related to a moving speed of the record bearing medium by observing said rotatable member;
    (d) second signal forming means for forming a second signal having a voltage which indicates the frequency of said first signal;
    (e) third signal forming means for forming a third signal having a frequency which is related to the voltage of said second signal; and
    (f) control means for forming a control signal to control said shifting means on the basis of said third signal.

6. An apparatus according to claim 5, wherein said third signal forming means includes a voltage controlled oscillator which is controlled by the voltage of said second signal, a center frequency of said voltage controlled oscillator being higher then the frequency of said first signal.

7. An apparatus according to claim 6, wherein said control means further includes a first counting circuit which counts up in synchronism with said third signal and has its counted value return to an initial datum every time a predetermined number "n" is counted; and a second counting circuit which counts up every time the counted value of said first counting circuit returns to the initial datum.

8. An apparatus according to claim 7, wherein said control means further includes a circuit which generates a rotation detecting signal synchronized with the rotation of said rotary head; and said second counting circuit is reset according to said rotation detecting signal.

9. An apparatus according to claim 8, wherein said control means further includes an oscillation circuit having a predetermined oscillation frequency; and a third counting circuit which counts a pulse signal produced from said oscillation circuit and is reset according to said rotation detecting signal.

10. A rotary head type reproducing apparatus for reproducing a recorded signal by having a rotary head trace many recording tracks formed at a predetermined pitch on a record bearing medium one after the other, comprising:
   (a) moving means including a rotatable member for rotating to move the record bearing medium,
   (b) shifting means for shifting said rotary head in a direction which crosses the rotating plane thereof;
   (c) first signal generating means for generating a a voltage in association with a moving speed of the record bearing medium by observing said rotatable member;
   (d) second signal generating means for generating a second signal having a voltage corresponding to a tracking error arising between said rotary head and said recording tracks;
   (e) third signal generating means for generating a third signal having a frequency corresponding to the voltage of said first signal and that of said second signal; and
   (f) control means for forming a control signal to control said shifting means on the basis of said third signal.

11. An apparatus according to claim 10, wherein one of pilot signals of different kinds having different frequencies is recorded on each of said recording tracks with an information signal; and said second signal generating means is arranged to form said second signal by using signals obtained by reproducing said pilot signals.

12. An apparatus according to claim 11, wherein said third signal generating means includes an addition circuit which adds said first and second signals together; and a voltage controlled oscillator which is under the control of a signal produced from said addition circuit.

13. An apparatus according to claim 11, wherein said control means further includes a first counting circuit which counts up in synchronism with said third signal and has its counted value return to an initial datum every time a predetermined number "n" is counted; and a second counting circuit which counts up every time the counted value of said first counting circuit returns to the initial datum.

14. An apparatus according to claim 13, wherein said control means further includes a circuit which generates a rotation detecting signal synchronized with the rotation of said rotary head; and said second counting circuit is arranged to be reset according to said rotation detecting signal.

15. An apparatus according to claim 14, wherein said control means further includes an oscillation circuit having a predetermined oscillation frequency; and a third counting circuit which is arranged to count a pulse signal produced from said oscillation circuit and to be reset according to said rotation detecting signal.

16. A rotary head type reproducing apparatus for reproducing a recorded signal by having a rotary head trace many recording tracks formed at a predetermined pitch on a tape-shaped record bearing medium one after the other comprising:
   (a) moving means including a rotatable member for rotating to move the tape-shaped record bearing medium in a longitudinal direction thereof;
   (b) shifting means for shifting the rotary head in a direction which crosses the rotating plane thereof;
   (c) first pulse signal generating means for generating a first pulse signal in relation to a moving speed of the tape-shaped record bearing medium by observing said rotatable member;
   (d) second pulse signal forming means for forming a second pulse signal by using the first pulse signal, the second pulse signal being of a higher frequency than that of the first pulse signal;
   (e) counting means for counting the second pulse signal; and
   (f) control means for forming a control signal to control the shifting means on the basis of the counted value obtained from said counting means.

* * * * *